United States Patent
Willems et al.

(10) Patent No.: US 6,377,654 B1
(45) Date of Patent: Apr. 23, 2002

(54) METHOD FOR MEASURING THE WALL THICKNESS OF A TUBULAR OBJECT

(75) Inventors: Peter Willems, Stekene (BE); Bart Vaessen, Breda (NL); Piet Dewaele, Berchem (BE); Yener Onel; Uwe Ewert, both of Berlin (DE)

(73) Assignee: Agfa-Gevaert, Mortsel (BE)

( * ) Notice: Subject to any disclaimer, the term of this patent is extended or adjusted under 35 U.S.C. 154(b) by 0 days.

(21) Appl. No.: 09/567,743

(22) Filed: May 10, 2000

(30) Foreign Application Priority Data

May 10, 1999 (EP) .............................................. 99201495

(51) Int. Cl.[7] .............................................. G01B 15/02
(52) U.S. Cl. ..................... 378/59; 378/54; 250/358.1
(58) Field of Search .................. 378/59, 54; 250/358.1, 250/359.1

(56) References Cited

U.S. PATENT DOCUMENTS

| | | | | |
|---|---|---|---|---|
| 3,796,874 A | * | 3/1974 | Roller et al. ................... | 378/54 |
| 4,330,835 A | * | 5/1982 | Gehm ........................... | 378/59 |
| 4,491,731 A | * | 1/1985 | Funyu et al. .................. | 378/59 |
| 4,675,528 A | | 6/1987 | Langner et al. ......... | 250/396 R |
| 4,695,729 A | * | 9/1987 | Monno et al. ................ | 378/59 |

FOREIGN PATENT DOCUMENTS

| | | |
|---|---|---|
| DE | 3123685 | 3/1982 |
| EP | 0009292 | 4/1980 |
| EP | 0664437 | 7/1995 |
| JP | 114263 | 9/1979 |

* cited by examiner

*Primary Examiner*—Drew Dunn
(74) *Attorney, Agent, or Firm*—John A. Merecki; Hoffman, Warnick & D'Alessandro LLC

(57) ABSTRACT

A digital representation of a radiation image of an at least partially tubular object is obtained. An attenuation profile over a tangentially imaged wall of the object is taken from the digital image on a straight line. The attenuation profile is reflected in the direction of the center of the object and the attenuation profile is reconstructed to form a relative density distribution by means of a transmission tomography-projection reconstruction method in which the measured reflected attenuation profile is used for all record annular positions.

14 Claims, 9 Drawing Sheets

METHOD FOR MEASURING THE WALL THICKNESS OF A TUBULAR OBJECT

FIELD OF THE INVENTION

The invention relates to a method for measuring the wall thickness of a tubular object. The method is suitable, for example, for contactless measurements of the wall thickness of a steel tube by using beams of high penetrating power.

BACKGROUND OF THE INVENTION

Usually, the wall thickness of pipelines is measured using projection radiography or projection radioscopy. For this purpose, a pipeline with or without insulation is transradiated by means of an X-ray tube for a gamma radiator. A film or other planar detector which is fixed at right angles to the beam direction is used to take a projection image of the pipeline which is located between radiation source and pipeline. The shadow image of the tube wall on the film on another detector is classically measured using a length measuring instrument (for example a ruler or calliper) after visual assessment. The wall thickness results after correction of the measured values using the known magnification ratio of the wall image. A problem in this case is that the visual determination of the wall limits to be measured is possible only imprecisely, because of radiated overexposure and unsharpness, and varies very strongly from evaluator to evaluator.

Various systems have been patented and described in order to circumvent this problem of subjective evaluation by humans, and these permit computer-aided evaluation and automate the measuring sequence in order to avoid measuring errors.

When a beam, for example an X-ray beam, traverses an object, the intensity of the beam decreases because of absorption in the object. The intensity of the beam can be considered as the number of photons, and also as the counter reading of radiation detectors. The physical relationships are reproduced by the following equation for the primary radiation, which forms the image:

$$I=I_0*EXP(-\mu x) \quad (1)$$

I being the intensity of the beam after traversing the object, $I_0$ the intensity of the beam before penetrating the object, EXP the base of natural logarithms, $\mu$ an absorption coefficient, which depends on the material and energy, and x the length of the traversal path of the beam in the object.

In addition to absorption, the beams which traverse an object also undergo scattering. The influence of this is taken into account by the so-called build-up factor B:

$$I=I_0*B*EXP(-\mu x) \quad (2)$$

B being greater than or equal to one. The build-up factor B is variable. It depends on the distance between the object and the beam detector, on the geometry and on the material of the object.

FIG. 1 shows a known method for measuring the wall thickness of a steel tube by using beams, and is disclosed in Japanese Laid-Open Patent Application No. 114263. FIG. 1 shows a tubular object (related by the number 1) which will be referred to below as "tube", for short, and whose wall thickness is to be measured. It is assumed that the tube is of cylindrical shape and therefore that its outer surface has a radius R1 and its inner surface a radius R2. An X-ray beam 2, which is directed perpendicular to the tube serves to scan the tube. The X-axis reproduces the traversal path x of the beam in the tube wall. The y-axis runs at a right angle to the tube axis, and thus also at a right angle to the tube wall. The I-axis reproduces the determined intensity I of the beam after traversal of the tube. A typical profile of an intensity curve (I as a function of y) is demonstrated in FIG. 1. The sites of the points of inflection S1 and S2 or S3 and S4 are determined on a measured curve P, the distance between the points of inflection S1 and S2 or S3 and S4 corresponds to the wall thickness of the tube. The point of inflection S1 or S4 is at the site where the beam runs tangential to the outer surface of the tube, and the attenuation of the beams is still minimal. The point of inflection S2 or S3 is at the site where the beam runs tangential to the inner surface of the tube and the attenuation of the beams is maximal.

A further known method for measuring the wall thickness of a steel tube by using beams is disclosed in German Laid-Open Patent Application No. 3123685 A1. In this method, the intensity curve in FIG. 1 is decomposed in at least three areas, and each of these sections is approximated by an equation. By solving these approximate equations, the y-co-ordinates of the points of inflection are determined, and the wall thickness is subsequently determined by subtraction.

This known method yields an inadequate accuracy in determining tube wall thickness, since it is virtually impossible exactly to find the points of inflection with an actual measurement because of unsharp imaging of the beam and of scattering of the beam in the material, particularly when the tube is filled with a liquid.

A very narrow beam is required in order to obtain a sharp image of the tube. Reducing the thickness of the beam leads to a reduction in the beam intensity which reaches the beam detector per unit of time. In order to reach the desired signal level, it is necessary to lengthen the measuring time up to several minutes per measuring point in accordance with the reduction in the thickness of the beam. The result of this is a measuring time of a few hours for each determination of the tube wall thickness.

The scattering of the beam continues to occur even with the reduction in the thickness of the beam. Reliable prediction of the extent of the scattering, the build-up factor B, and the correction resulting therefrom for the unsharpness owing to scattering is virtually impossible, particularly when the tube is filled with a liquid which causes additional scattering.

The use of radiation shields, so-called collimators reduces the scattering. A collimator is designed such that a planar slit which is formed by two rectangular solid radiation screens permits the beam path to pass in a geometrically defined fashion. The use of a collimator describes the direction of the measurement of the wall thickness, that is to say the measurement of the wall thickness can be performed only in alignment with the collimator. For this reason, the collimator is aligned perpendicular to the tube. The measurement of the wall thickness in a tube bend wrapped with insulation is virtually impossible with the collimator, because it is not possible to ensure the collimator is aligned exactly perpendicular to the covered tube surface.

As has been shown above, the known method is not feasible for actual application in measuring wall thickness; this holds, in particular, for inspecting pipelines in chemical plants and in refineries.

European patent application 0 009 292 A discloses a method of determining the thickness of a tubular object. The tubular object is tangentially irradiated from its outer side. From maxima and minima of an irradiation pattern obtained in a plane which is perpendicular to the axis of the tubular object the wall thickness is calculated.

OBJECT OF THE INVENTION

It is an object of the invention to provide a method for measuring the wall thickness of at least partially tubular objects that overcomes the problems of the prior art.

SUMMARY OF THE INVENTION

The method of the present invention is suitable for use in inspecting objects that are at least partially tubular such as the pipelines in chemical plants and in refineries. It is suitable for measuring wall thickness under real operating conditions, that is to say when the partially tubular object is empty or filled e.g. when a fluid is flowing through the tube, when the surface temperature of the tube is in the range from −120° C. to +400° C., when the tube is covered because of the insulation, and when the pipeline runs in various sweeping tube bends.

The method of the invention comprises the following steps:

- a tubular part of an object is transradiated by radiation emitted by a radiation source,
- the radiation image of said tubular part is recorded with the aid of a radiation detector,
- the radiation image is converted into a digital image,
- an attenuation profile is taken from the digital image on a straight line, the attenuation profile comprising a tangential image of the wall of the tubular part of the object and a section outside the tubular object and a section inside the tubular object,
- the attenuation profile is reflected in the direction of the centre of said object to obtain a measured reflected attenuation profile,
- a relative density distribution of the object is reconstructed by means of a transmission tomography-projection reconstruction method in which the measured reflected attenuation profile is used for all annular positions,
- a density profile is selected from this density distribution by scanning on a straight line through the midpoint of the object, this density profile reproducing the wall of at least the tubular part of the object with its bordering surroundings, the wall being represented by an emphasised section because of the difference in density relative to its bordering surroundings,
- positions of outer and inner surface of said wall are determined from said density profile, and
- the wall thickness is determined from the spacing between the positions of the outer and inner surfaces of the wall.

The radiation detector may be an X-ray film, a line camera, a storage phosphor, an X-ray image intensifier or a detection system based on semiconductors or the like.

The positions of the outer and inner surfaces of the wall are determined in a region between 25% and 75% of the height of the density profile in the emphasised section. Preferably 50% of the height of the density profile in the emphasised section is taken.

The radiation source may be an X-ray tube or a gamma radiator which is arranged opposite the radiation detector, the object being located between the radiation source and radiation detector.

The measured wall thickness is then preferably corrected by a magnification factor resulting from the recording geometry.

In another embodiment the radiation source and the radiation detector are arranged in such a way that a parallel beam projection profile is produced.

In order to determine the wall thickness from radiation projection profiles of at least partially tubular objects with a constant wall thickness, the reflected profile may be replaced by a profile over the entire cross section of the object.

The reflection of the measured profile can be dispensed with and that the projection reconstruction can be carried out over an angle of 90 degrees.

A series of values of constant intensity may be added to the attenuation profile at the site of the reflection point, this constant intensity being determined from measured intensity values which are the nearest to the reflection point being fixed in the centre of this series of constant intensity values.

The wall thickness may be determined from the spacing between the extreme values of the derivative of the reconstructed density profile.

The reconstructed density profile may be smoothed before or after the derivation, and the wall thickness may then be determined from the spacing between the extreme values of the derivative.

It is also possible to take a plurality of parallel, neighbouring attenuation profiles along the wall of the tubular object from the digital image, and to calculate a new attenuation profile by combining these attenuation profiles, and then to use this attenuation profile to calculate the relative density distribution as set out higher.

The number of the points of the measured profile or of the reconstructed density distribution in case of the non-constant as well as in case of constant wall thickness may be increased by interpolation, so that the wall thickness is determined with a higher resolution.

BRIEF DESCRIPTION OF THE DRAWINGS

Further advantages as well as particular embodiments of the present invention will become apparent from the following detailed description illustrated by means of the following drawings wherein.

DETAILED DESCRIPTION

In order to determine the wall thickness of empty or filled tubular or partially tubular objects 1, the latter are transradiated by means of X-radiation or gamma radiation 2 of suitable energy. This can involve both a method using parallel beams, as in FIG. 1, and a method using fan-shaped or conical beams, as in FIG. 2.

Both arrangements are based on the fact that a measurable intensity profile P can be taken as a function of the measuring position from the radiographic image projected on to a planar or linear or scanning punctiform detector 4.

This is performed either directly electronically via analog-to-digital conversion or from values of a photon counter or by film digitisation by means of an optical scanner or by digitisation of an image obtained by scanning a photographic film or a photostimulable phosphor screen etc.

Typical planar detectors in this case are films, X-ray image intensifiers, storage films, photo-stimulable phosphor screens, planar detectors based on amorphous silicon with converting fluorescence screens or semiconductors etc.

Linear profiles can also be obtained directly using detector arrays or line cameras. Still other ways of obtaining a digital image representation are possible.

Figure 1:
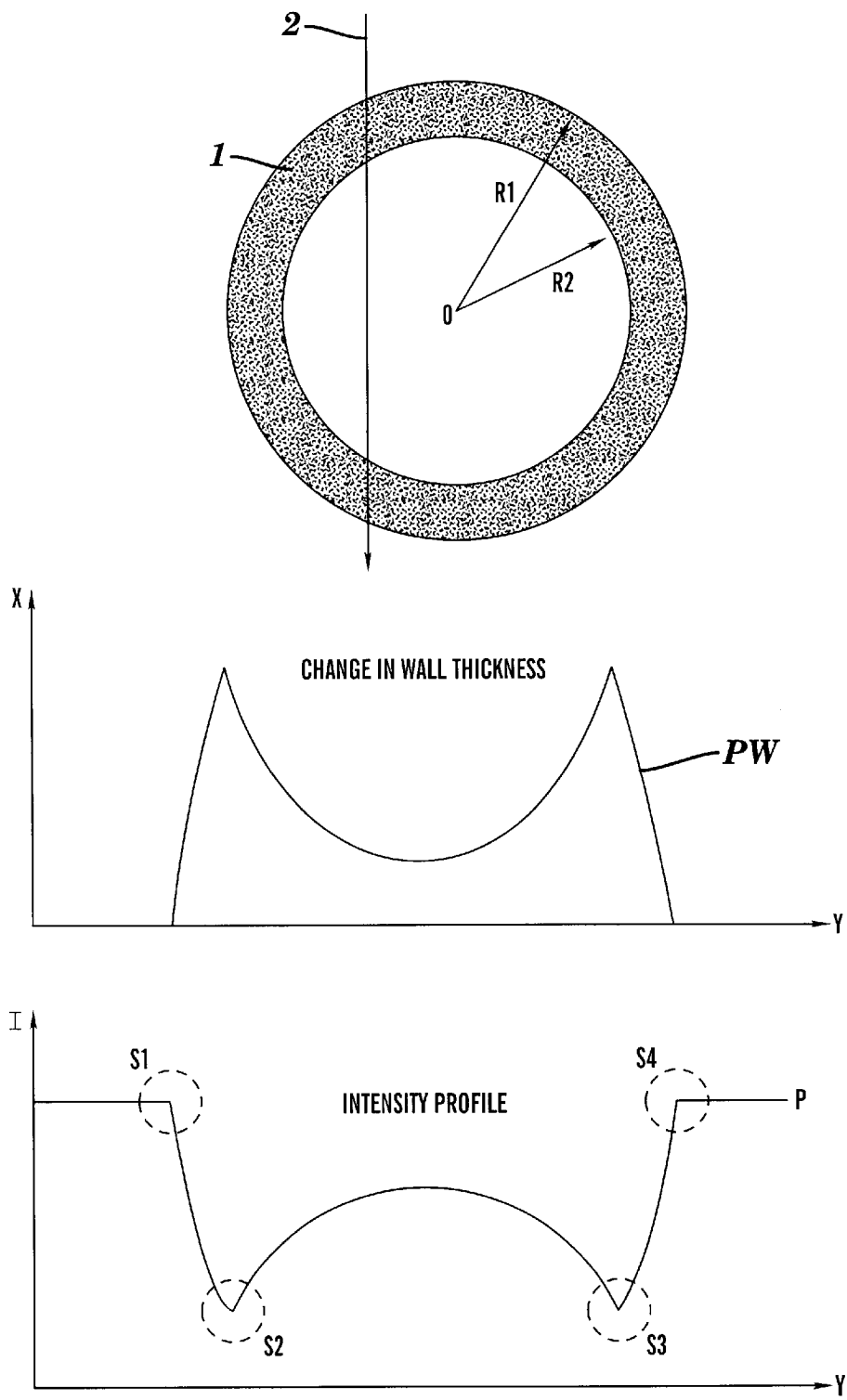
FIG. 1 illustrates a wall thickness measurement method of the related art, transradiation of an object by means of parallel beams.

A measured intensity profile P is characterised by a typical shape which results from the change in wall thickness PW as a function of the transirradiation position y (FIG. 1). The extreme values occurring in this case are used in conventional methods to determine the wall thickness. The corresponding points are marked by S1–S4 in the intensity profile P, it being possible to determine the left-hand or right-hand wall thickness from the distance S2–S1 or S4–S3 along the y-axis. The profile representation in FIG. 1 results from the law of radiation absorption. In practice, the profile P is disturbed by various factors. The effects of unsharpness and scattered radiation may lead to sizeable deviations of the measured profiles from the ideal shape. The positions S1–S4 can then no longer be determined exactly. The displacement of the positions of the nadir point edges or the extreme values also occurs.

Figure 2:
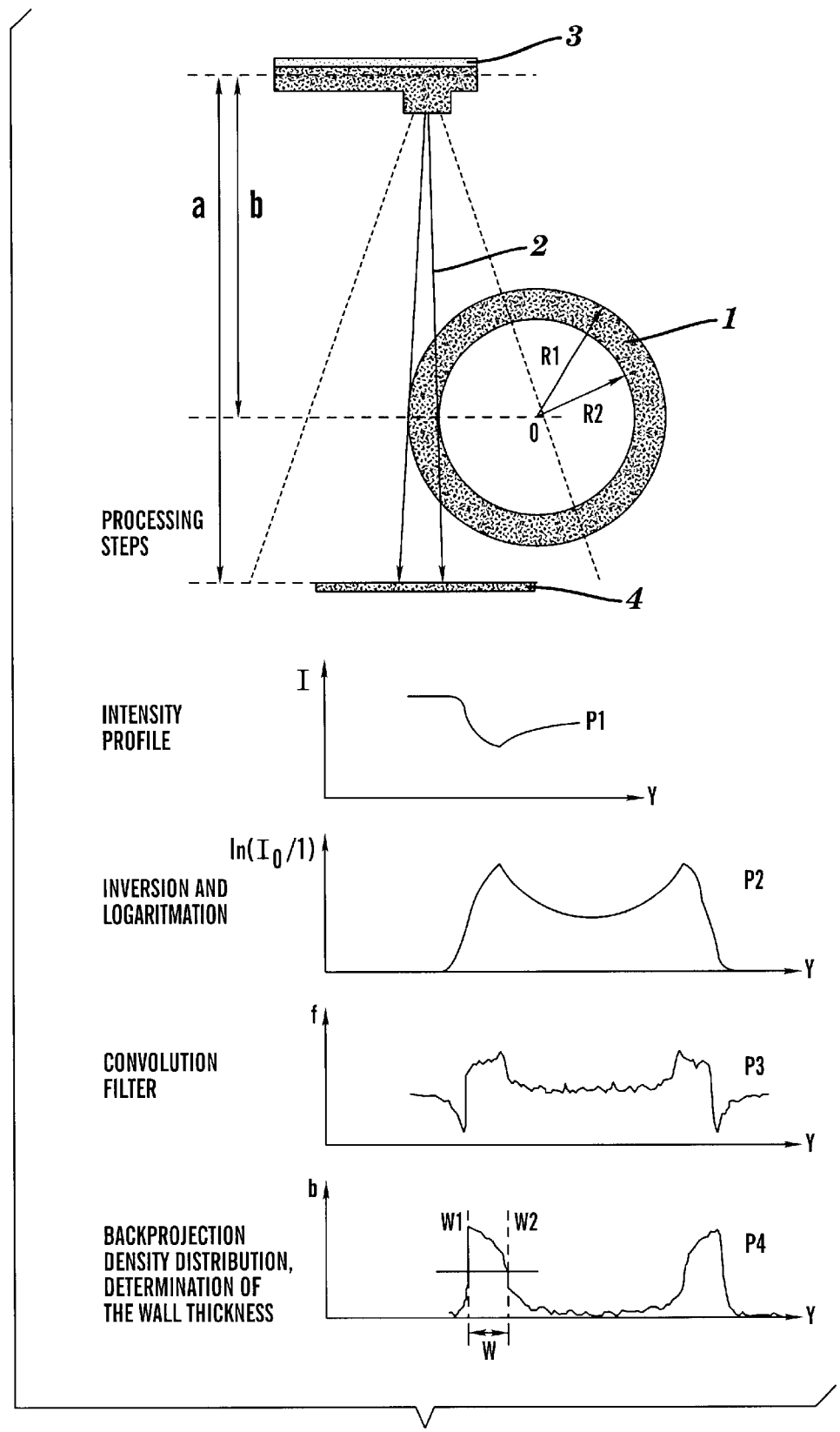
FIG. 2 illustrates the wall thickness measurement method of the present invention in the case of transradiation of an object by means of conical beams.

When use is made of x-ray tubes or gamma radiators 3 in conjunction with planar or linear detectors, the recording geometry is generally the technique of a fan-shaped or conical beam (FIG. 2).

It is preferable in this case to maintain an exact prescribed recording geometry, or to measure the corresponding deviations, in order to take account computationally of magnifying effects and deviations of the detector position from the optimal position. In the case of the recording arrangement according to FIG. 2, the dimensions a and b are necessary in order to take account of the geometrical magnification $$V = a/b \quad (3).$$

Equation (3) becomes more complicated for other geometries.

In order to determine the wall thickness, in the present exemplary embodiment the measured profile P1 is inverted and logarithmized in order to prepare the projection reconstruction:

$$P2 = \ln(I_0/P1) \quad (4).$$

FIG. 2 shows the result of this operation as P2. The reflection of the measuring profile, and an extension of the profile line in the interior of the tube are to be seen as dotted lines.

Figure 6:
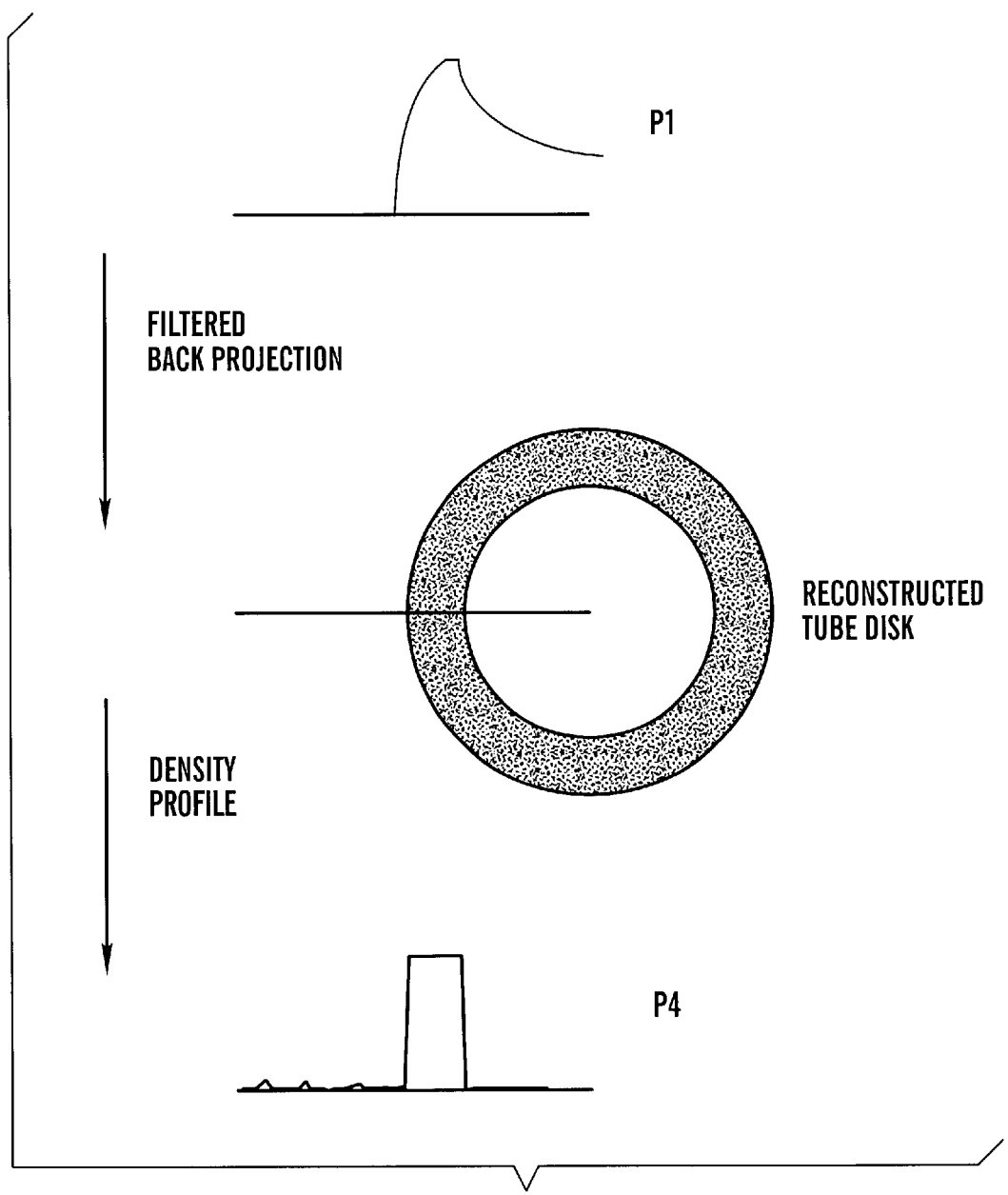
FIG. 6 illustrates the result of the projection reconstruction.

FIG. 6 shows the result of the projection reconstruction.

All known back projection methods can be used. In the particular embodiment described further on a filtered back projection was used.

Several other back projection methods are described extensively in chapter 10 of A. K. Jain, Fundamentals of image processing, Prentice Hall [ref. 1], and in chapter 8 of A. Rosenfeld and A. C. Kak, Digital Picture Processing, Academic Press 1982 [ref. 2].

A first type of methods is based on the radon transform, which provides the mathematical framework necessary for going back and forth between spatial coordinates (x,y) and projection space coordinates (s, θ).

Figure 3:
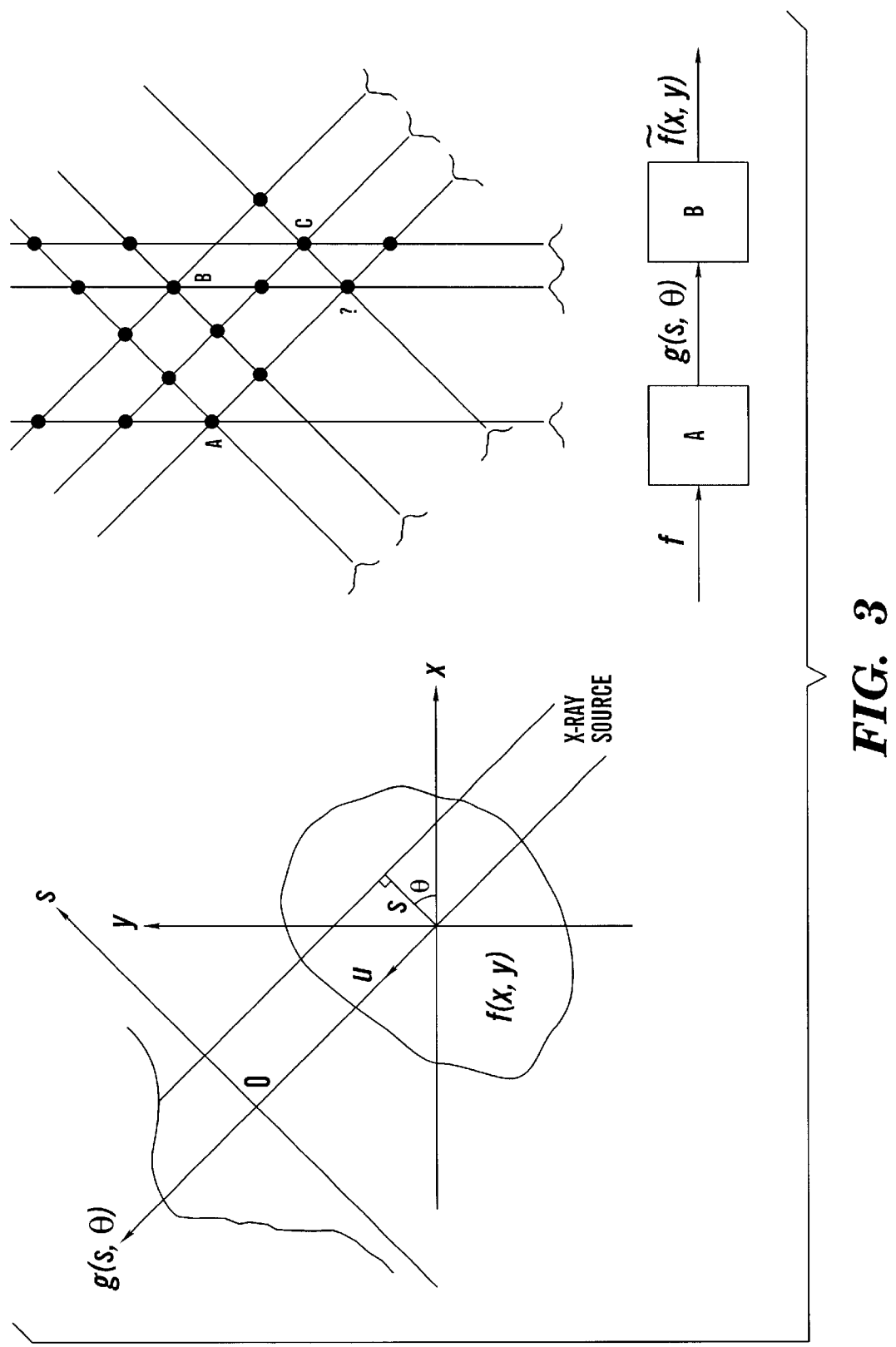
FIG. 3 illustrates the reconstruction of an three-dimensional image from projections g(s, θ) from all directions.

Reconstruction of an image requires projections g(s, θ) from all directions. This can be seen in the FIG. 3 taken from A. K. Jain [1]. This is theoretically equivalent in finding the inverse Radon transforms of g(s, θ).

Essential in obtaining this inverse is the projection theorem. This theorem equates the one-dimensional Fourier transform with respect to s of the projection g(s, θ) to the two-dimensional Fourier transform of the function describing a central slice of the object at angle θ.

In practice the inverse radon transform can be obtained in several ways:
a) By applying a filter with the desired frequency response $|\xi|$ and then back-project the filtered projections.
b) Using Hilbert transforms. In this way the inverse Radon transform may be derived by convolving the differentiated projections with $1/2\pi s$ and then back-projecting the result.
c) Filtering in Fourier space.

Figure 4:
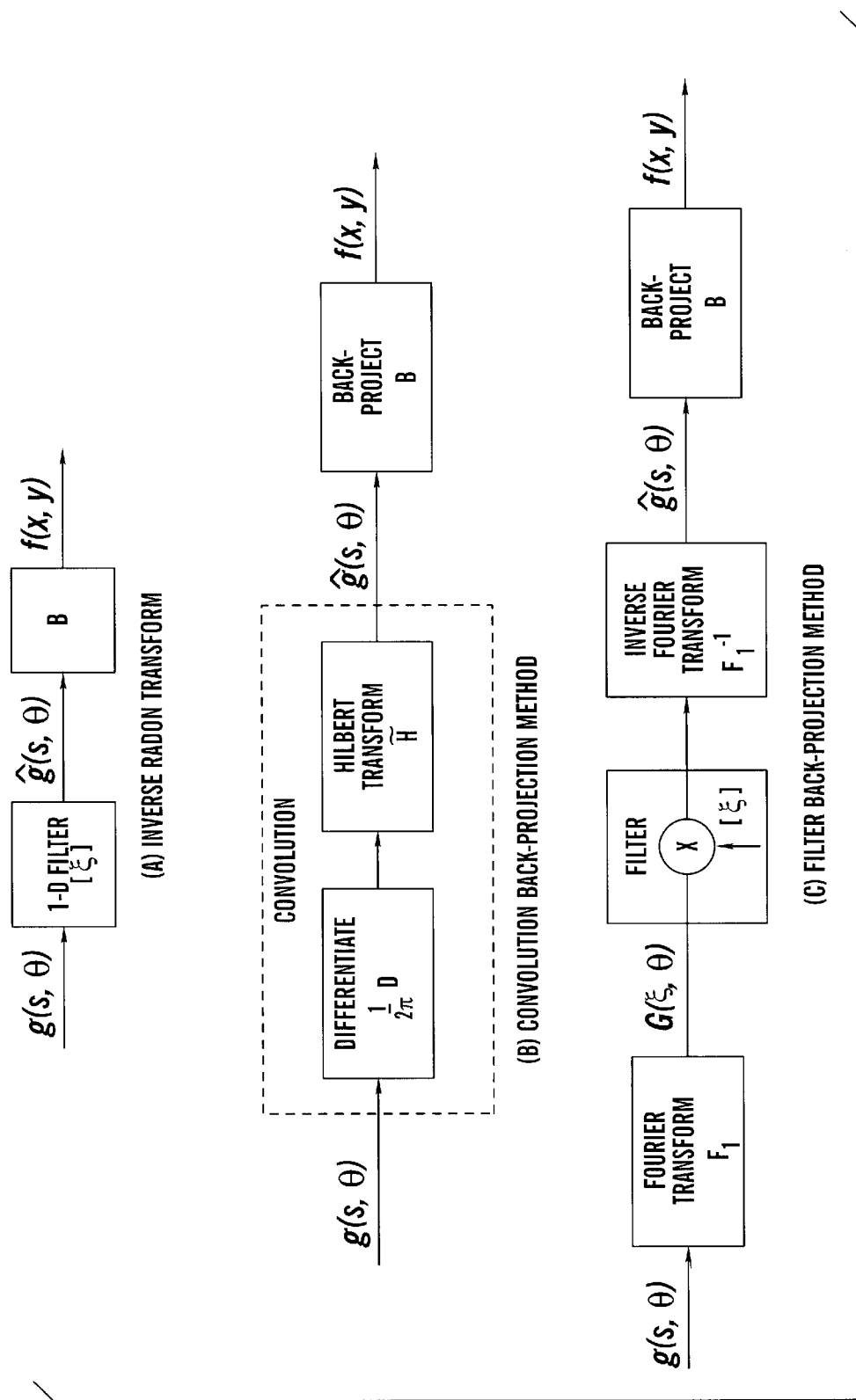
FIG. 4 illustrates Radon transform based back projection methods.

These are depicted in FIG. 4 taken from A. K. Jain [ref. 1]

The filter function required for the inverse Radon transform emphasises high spatial frequencies. Since most images have low signal-to-noise ratio at high spatial frequencies, additional noise amplification by the use of this filter should be avoided. In order to limit noise amplification a band limiting filter is applied. All band limiting filters proposed in [ref. 1–ref. 2] can be applied, but the invention is not limited to this selection of reconstruction filters.

Other reconstruction methods may be used such as the Fourier reconstruction method (see paragraph 10.10 of [ref. 1]) and the Algebraic reconstruction method (see paragraph 10.11 of [ref. 1]).

Figure 5:
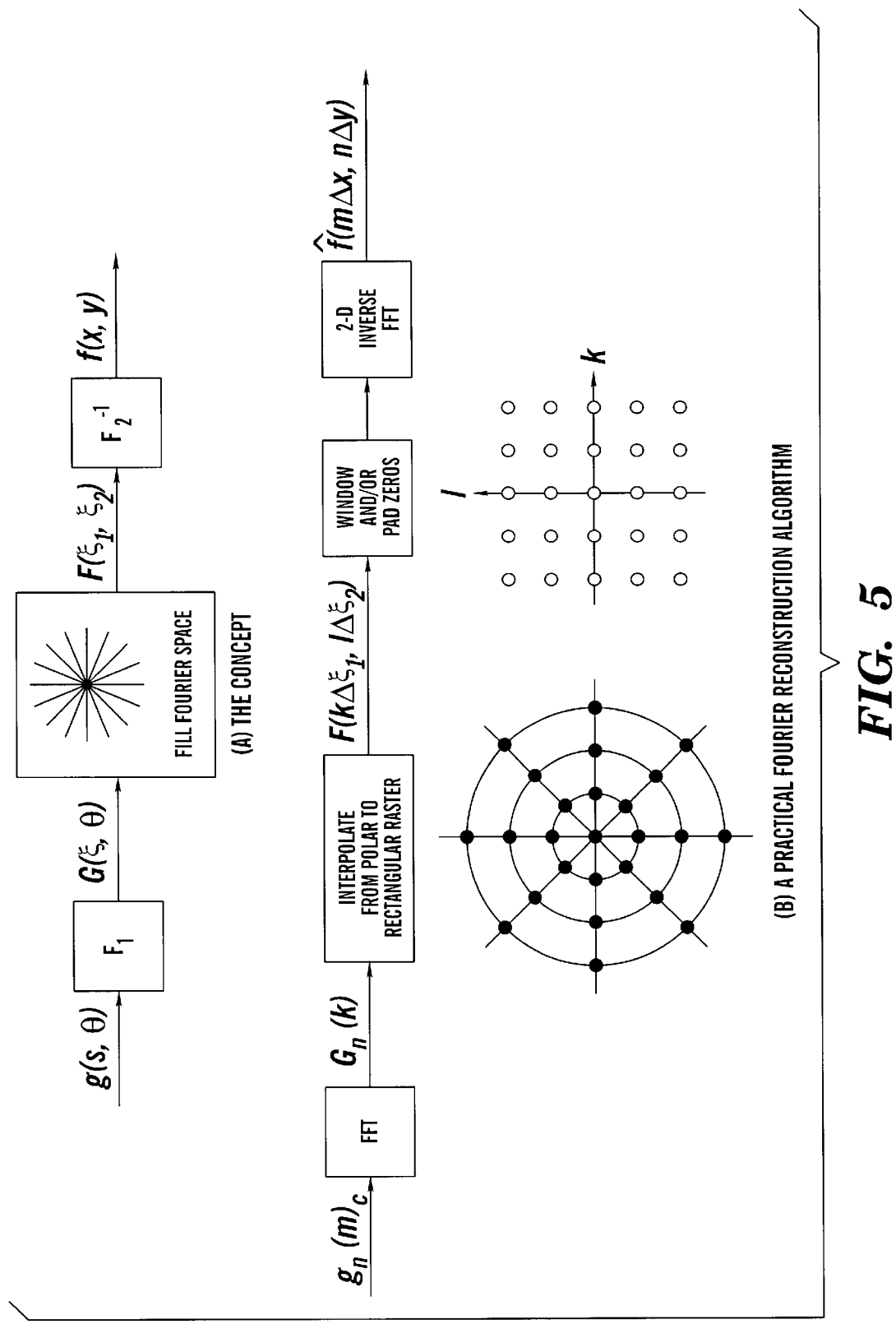
FIG. 5 illustrates Fourier reconstruction algorithm.

The Fourier reconstruction method is based on the projection theorem. The two dimensional Fourier space is filled by one-dimensional Fourier transforms of the projections. Then the two dimensional inverse Fourier transform is taken. This is depicted in FIG. 5 taken from A. K. Jain [ref. 1].

Algebraic reconstruction techniques apply iterative algorithms to solve a set of equations. This set of equations relates the object function to the projections for a discrete set of object grid points. All known algebraic reconstruction algorithms may be applied.

In the present case, a filtered back projection was used (see FIG. 6), all the 180 projections used here being identical to P2. After the filtering of P2, P3 results from convolution using the filter function (for example Bracewell filter) as:

$$P3 = \text{Filter} * P2 \quad (5).$$

The back projection can be performed over 180° or over 90°:

$$P4(y) = \sum_{i=1}^{N} P3(y\cos(\alpha_i))\Delta\alpha. \quad (6)$$

It is important in this case to use the reflection point as a virtual rotation point (y=0). A radial profile at an arbitrary site (for example in accordance with Equation 6) is taken from a calculated planar tube profile. This profile corresponds approximately to the density distribution P4 inside and outside the pipeline, and is used to determine the wall thickness W=W2−W1. It is to be noted that the unsharpnesses which occur no longer influence the mean wall thickness measured at half the height of the wall profile. Neither is this measurement disturbed when a medium with a low radiographic density by comparison with the wall material is used as a filling. The true wall thickness results from the measured value W (FIG. 2) connected by division by the value of the geometrical magnification V.

It is an advantage of this method that the blurring of the corners and tips of the profile P1 by increased unsharpness is not critical. In particular, an increased unsharpness results in the case of the use of gamma radiators which generate a high internal unsharpness $u_i$ in the detector (for example Co-60 with $u_i \geq 400$ μm) because of their high radiation energy, or in the case when the required distance between the radiation source and detector is undershot in a fashion induced by the installation, and thereby causes increased geometrical unsharpness. The deliberate undershooting of the distances between the radiation source and detector can lead in this case to substantial savings in measuring time and costs.

By comparison with other methods, which are based on high-pass filtering of the measured profiles, the signal-to-noise ratio of the measured profile owing to conversion to the density profile is reduced only slightly. High-pass filters, which are based on the $1^{st}$ or higher derivatives, cannot generally be employed if no specific measures are adopted to improve the signal-to-noise ratio. This effect once again accords an advantage in measuring time or a cost advantage for the method described, since there is less need for outlay or exposure time in order to achieve results which are comparable with other methods.

Figure 7A:
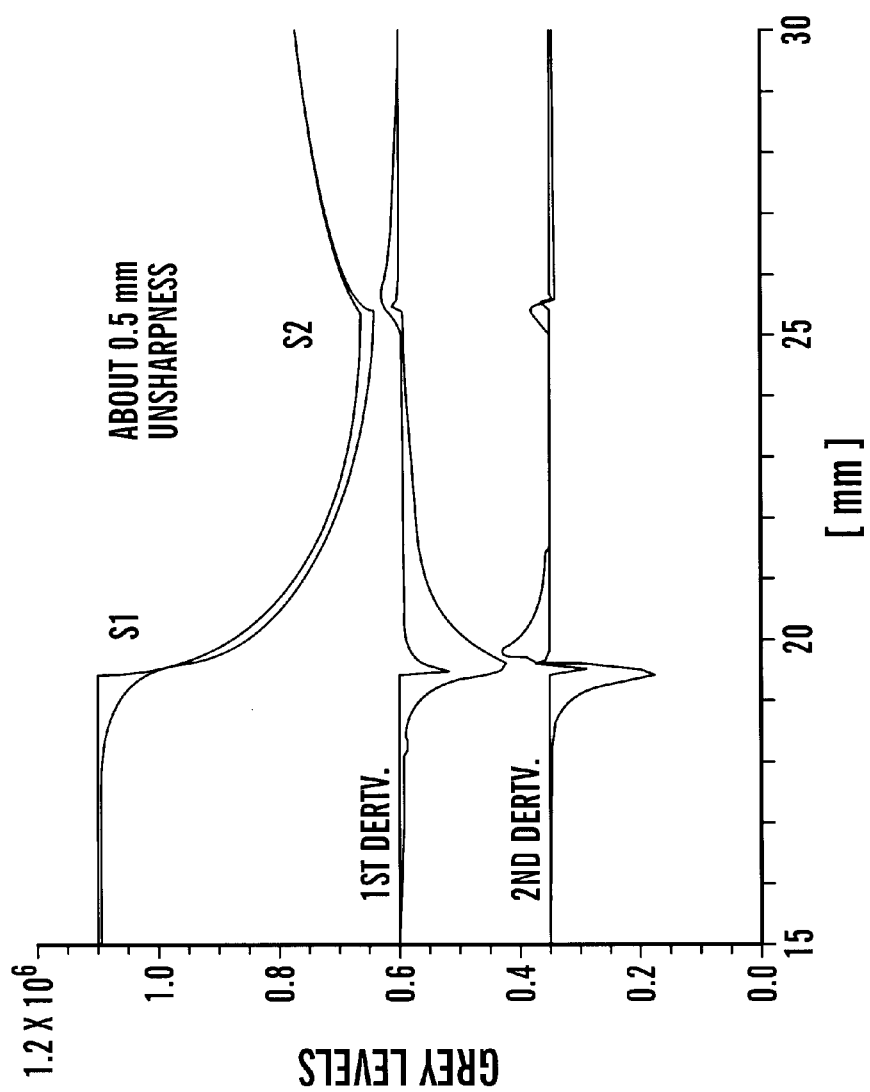
FIG. 7 illustrates the influence of the arising unsharpness for a conventional method (FIG. 7a) and for the method according to the invention (FIG. 7b)
Figure 7B:
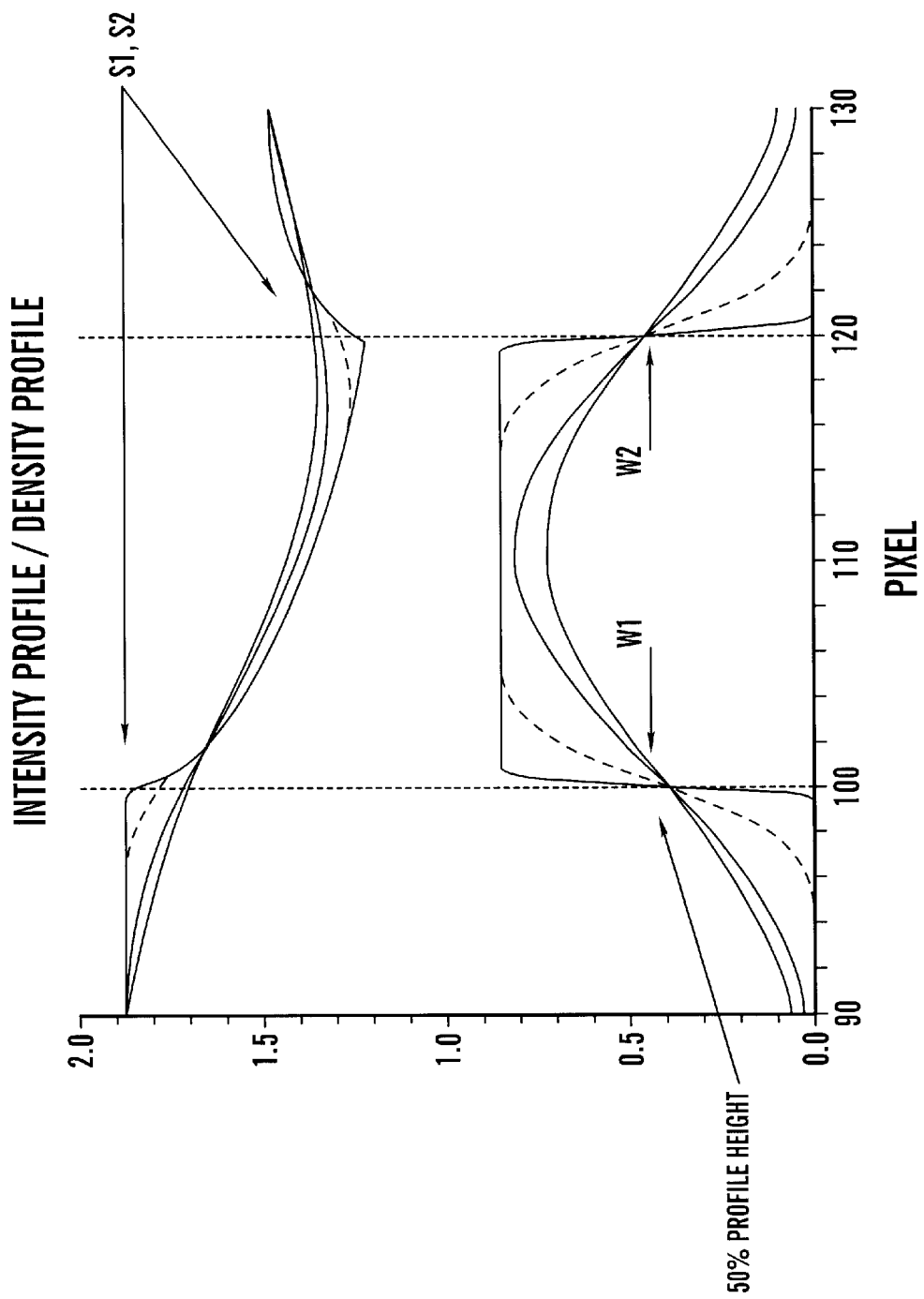

FIG. 7 shows the influence of the rising unsharpness on the measurement profiles and the measured and the reconstructed profiles. Whereas the rise in unsharpness clearly alters the profiles in FIG. 7a and the points S1 as well S2 are blurred, the wall thickness distances W2−W1 in FIG. 7b, measured at half the height of the profile, remain constant.

Figure 8:
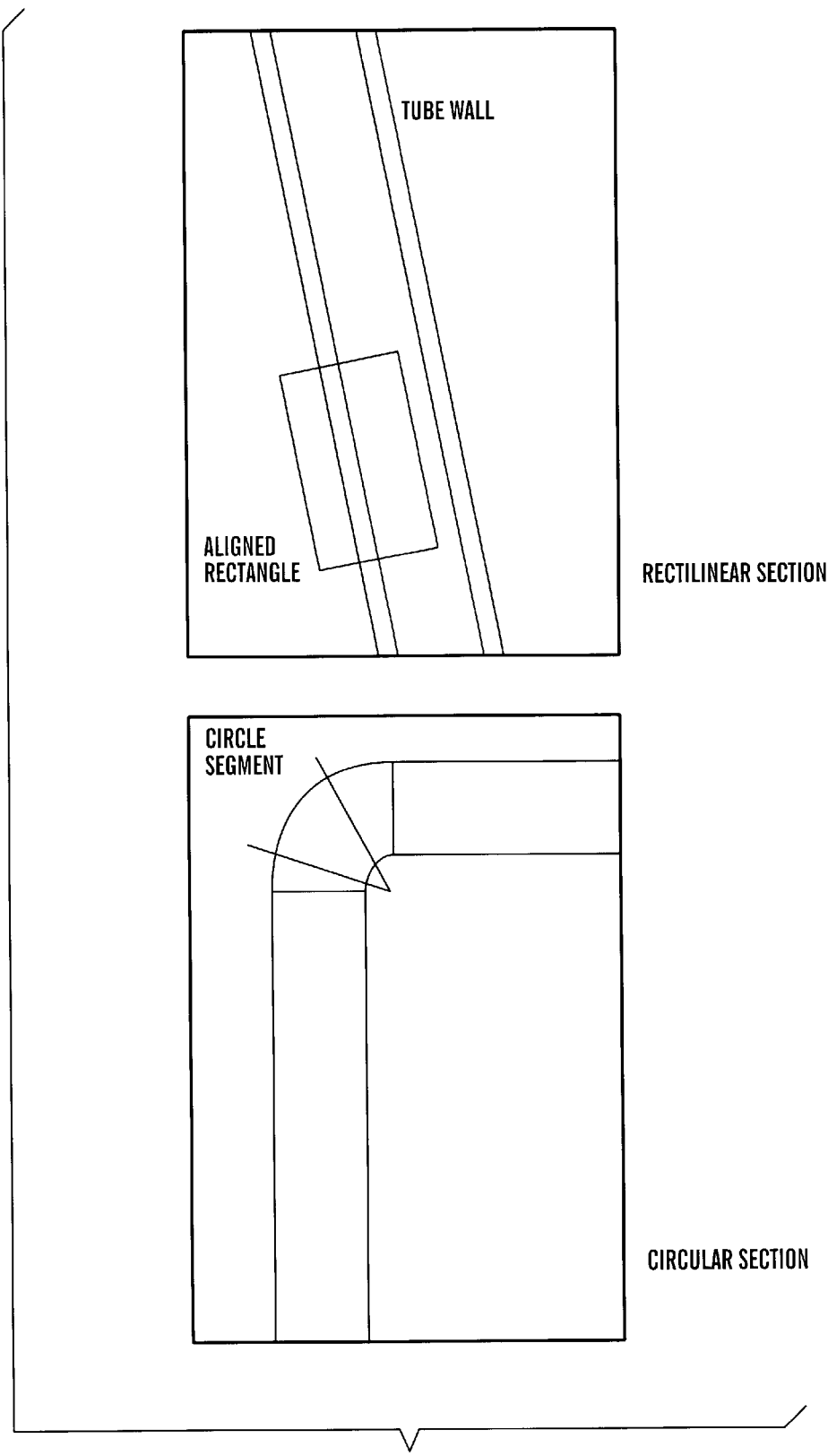
FIG. 8 illustrates an extension of the method of the present invention for computation of a sequence of successive wall thicknesses along the axial direction of a tubular object.

The wall thickness measurement method can be extended to compute a sequence of successive wall thicknesses along the axial direction of a tubular object. This is illustrated in FIG. 8. Two predominant tubular shapes are of particular importance here, the linear tube (FIG. 8a) and circular segment (FIG. 8b) respectively. Precisely because it is unknown where the thinnest tube cross-section occurs along the axial path of a tube, the automatic computation of the wall thickness as a function of axial position is a desirable feature of an automatic non-destructive inspection device, since it may reveal the most critical position. The following discloses how such functionality is achieved.

(1) along the axial axis of a Wall thickness computation rectilinear tube. To this purpose, a rotated rectangle is positioned in the image covering the tube section of interest. The angle of the rectangle is adjusted so as to be aligned parallel to the tube axis. This is achieved either (a) manually by the operator using a graphical user interface, or (b) automatically using the computed orientation of the tube in the image. The latter option is made clear hereafter. The rotated rectangle is defined by a base line and a height, and may eventually lie partially outside the image. Also, it is an advantage of the method that the base line need only partially extend over the tube cross-section, so that only one of both walls of the tube is covered. The original input image A is resampled along a Cartesian grid in the rectangle to yield a an output image B wherein the tube part is perfectly parallel to the vertical image borders of the output image. Prior art (such as presented in G. Wolberg, Digital Image Warping, IEEE Computer Society Press, Ch. 6 Image Resampling) was used to determine the output pixels from a combination of input pixels such as bilinear interpolation or cubic B-spline interpolation. Next, the image B is subjected to a vertical smoothing filter to increase the signal-to-noise ratio in a image C. The importance of perfect alignment becomes clear since otherwise the tube-air edge would be blurred leading to erroneous thickness values. Said smoothing or integration may be achieved by a straightforward box filter or a Gaussian filter commonly known from prior art such as B. Jähne, Digital Image Processing, Springer-Verlag, 1993, Ch. 6.1 Smoothing. Each of the horizontal lines in the image C is finally forwarded to the wall thickness measurement algorithm to yield one value of the wall thickness (or two values when applied to opposite sides of the profile). The sequence of such values constitutes the wall thickness profile along the axial direction and such profile is displayable by any graph drawing program to identify and extract the most critical cross-section of the tube. The wall thickness resulting from this algorithm is converted to physical length using a conversion. The conversion factor is determined either (a) by using a simultaneously exposed ruler or (b) automatically, using the number of pixels between outer edge points of the tube on the base line. The outer diameter of the tube normally is not affected during the tube's lifetime and is known and stored beforehand. Calculating a histogram of quantized orientation values of tube-air edge pixels and retaining the orientation of the maximum value of the histogram solves the problem of automatic extraction of the rectangle orientation. The tube-air pixels normally are those pixels having larger gradient magnitude so that thresholding the magnitude of an edge detection operator yields the useful edge pixels. Any edge operator having magnitude and floating edge orientation can be used here such as the commonly known Sobel or Canny edge detector.

Wall thickness computation along the axial axis of a circular tube section. Although circular tube sections are more difficult in quantifying wall thickness, they are highly desirable sections to inspect since corrosive fluid action is intensified there due to increased flow turbulence. In contrast to rectilinear sections, after having drawn the top and bottom line of a circular section of interest here, resampling in radius-theta (r, θ) space is performed, also yielding an image B having the tube-air edge perfectly parallel to the image borders. The origin of the (r, θ) space is either determined (a) manually using prior knowledge of the radius of the section or (b) automatically using a Hough Transform for circles applied to the edge pixels of the circular section. More generally, the Generalized Hough Transform can detect any parameterizable shape, and hence a sequence of profiles is constructed by resampling perpendicularly to the tangent line of the curved path of the tube-air transition. The wall thickness similarly follows from applying the thickness determination algorithm to any such profile.

What is claimed is:

1. Method for determining wall thickness of at least partially tubular objects from radiation density projection images of said objects, comprising the steps of transradiating a tubular part of an object by radiation emitted by a radiation source, recording a radiation image of said tubular part with the aid of a radiation detector, converting said radiation image into a digital image, taking an attenuation profile from said digital image on a straight line, said attenuation profile comprising a tangential image of the wall of the tubular part of the object and a section outside the tubular object and a section inside the tubular object, reflecting said attenuation profile in the direction of the centre of said object to obtain a measured reflected attenuation profile, reconstructing a relative density distribution of the object by means of a transmission tomography-projection reconstruction method in which the measured reflected attenuation profile is used for all annular positions, selecting a density profile from this relative density distribution by scanning on a straight line through the midpoint of the object, this density profile reproducing the wall of at least the tubular part of the object with its bordering surroundings, determining positions of outer and inner surface of said wall from said density profile, determining the wall thickness from the spacing between the positions of the outer and inner surfaces of the wall.

2. A method according to claim 1 wherein the positions of the outer and inner surfaces of the wall lie in a region between 25% and 75% of the height of the density profile in the emphasised section.

3. A method according to claim 1 wherein the positions of the outer and inner surfaces of the wall lie at 50% of the height of the density profile in the emphasised section.

4. A method according to claim 1, wherein the radiation source is an X-ray tube or a gamma radiator which is arranged opposite the radiation detector, the object being located between the radiation source and radiation detector.

5. Method according to any of claim 1, wherein the measured wall thickness is corrected by a magnification factor resulting from the recording geometry.

6. Method according to claim 1, wherein that the radiation source and the radiation detector are arranged in such a way that a parallel beam projection profile is produced.

7. Method according to claim 1 for determining the wall thickness from radiation projection profiles of at least partially tubular objects with a constant wall thickness, wherein the reflected profile is replaced by a profile over the entire cross section of the object.

8. Method according to claim 1, wherein the reflection of the measured profile is dispensed with and wherein the projection reconstruction is carried out over an angle of 90 degrees.

9. Method according to claim 1, wherein a series of values of constant intensity are added to the attenuation profile at the site of the reflection point, this constant intensity being determined from measured intensity values which are the nearest to the reflection point being fixed in the centre of this series of constant intensity values.

10. Method according to claim 1, wherein the derivative of the density profile is calculated, and wherein the wall thickness is determined from the spacing between the extreme values of the derivative.

11. Method according to claim 1 or 9, wherein the density profile is smoothed before or after the derivation, and wherein the wall thickness is determined from the spacing between the extreme values of the derivative.

12. Method according to claim 1, wherein a plurality of parallel, neighbouring attenuation profiles along the wall of the tubular object are taken from the digital image, and in that a new attenuation profile is calculated by combining these attenuation profiles, and in that this attenuation profile is used to calculate the relative density distribution.

13. Method according to claim 1, wherein the number of the points of the measured profile or of the relative reconstructed density distribution is increased by interpolation, and the wall thickness is determined with a higher resolution.

14. Method according to claim 1, wherein the radiation detector is selected from the group consisting of an X-ray film, a line camera, a storage phosphor, an X-ray image intensifier and a detection system based on semiconductors.

* * * * *